June 27, 1950  E. J. ADAMS  2,512,988
LOADING AND UNLOADING DEVICE
Filed March 11, 1947  3 Sheets-Sheet 1
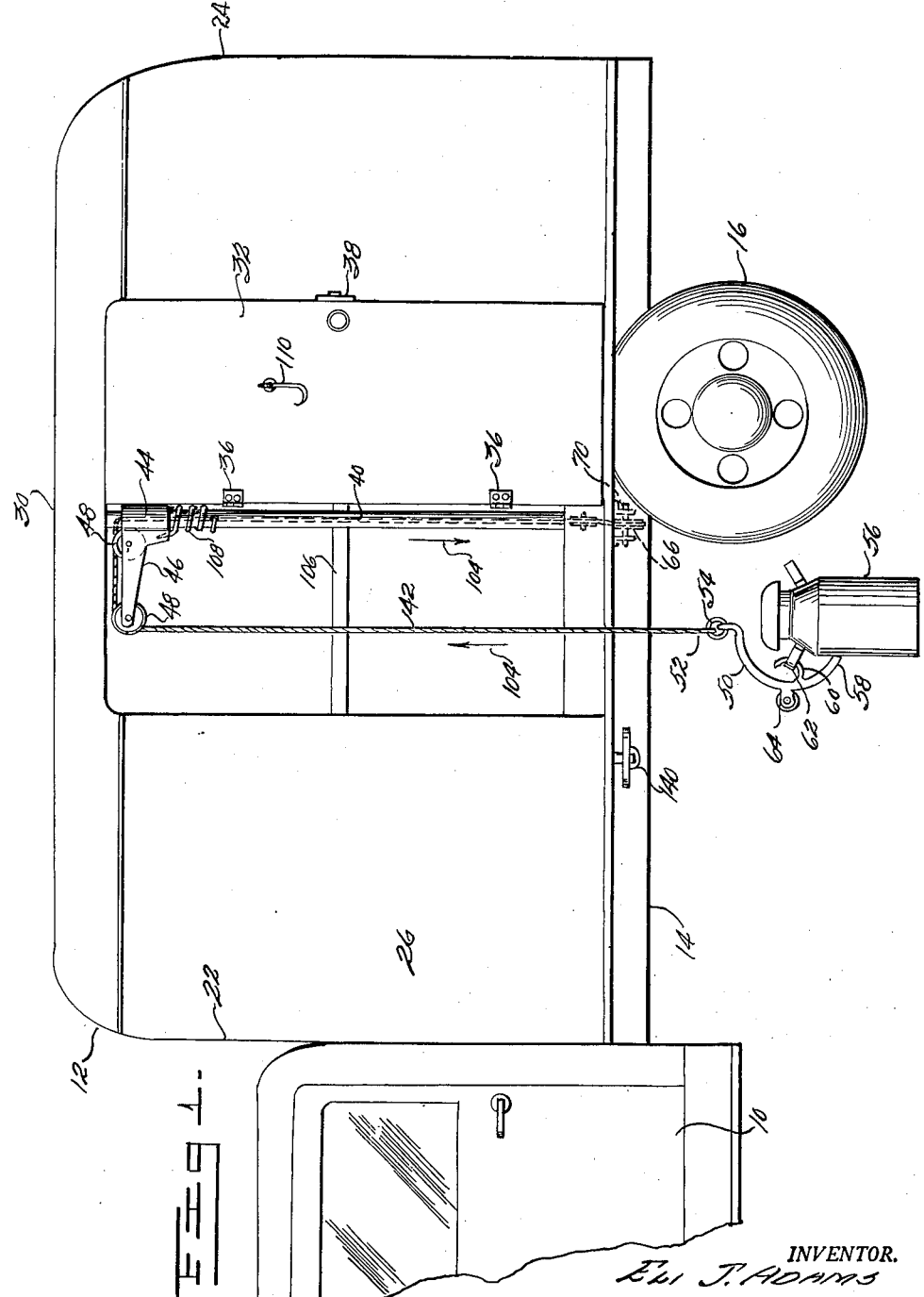
INVENTOR.
Eli J. Adams
BY
McMorrow, Berman & Davidson
ATTORNEYS June 27, 1950 — E. J. ADAMS — 2,512,988
LOADING AND UNLOADING DEVICE
Filed March 11, 1947 — 3 Sheets-Sheet 2
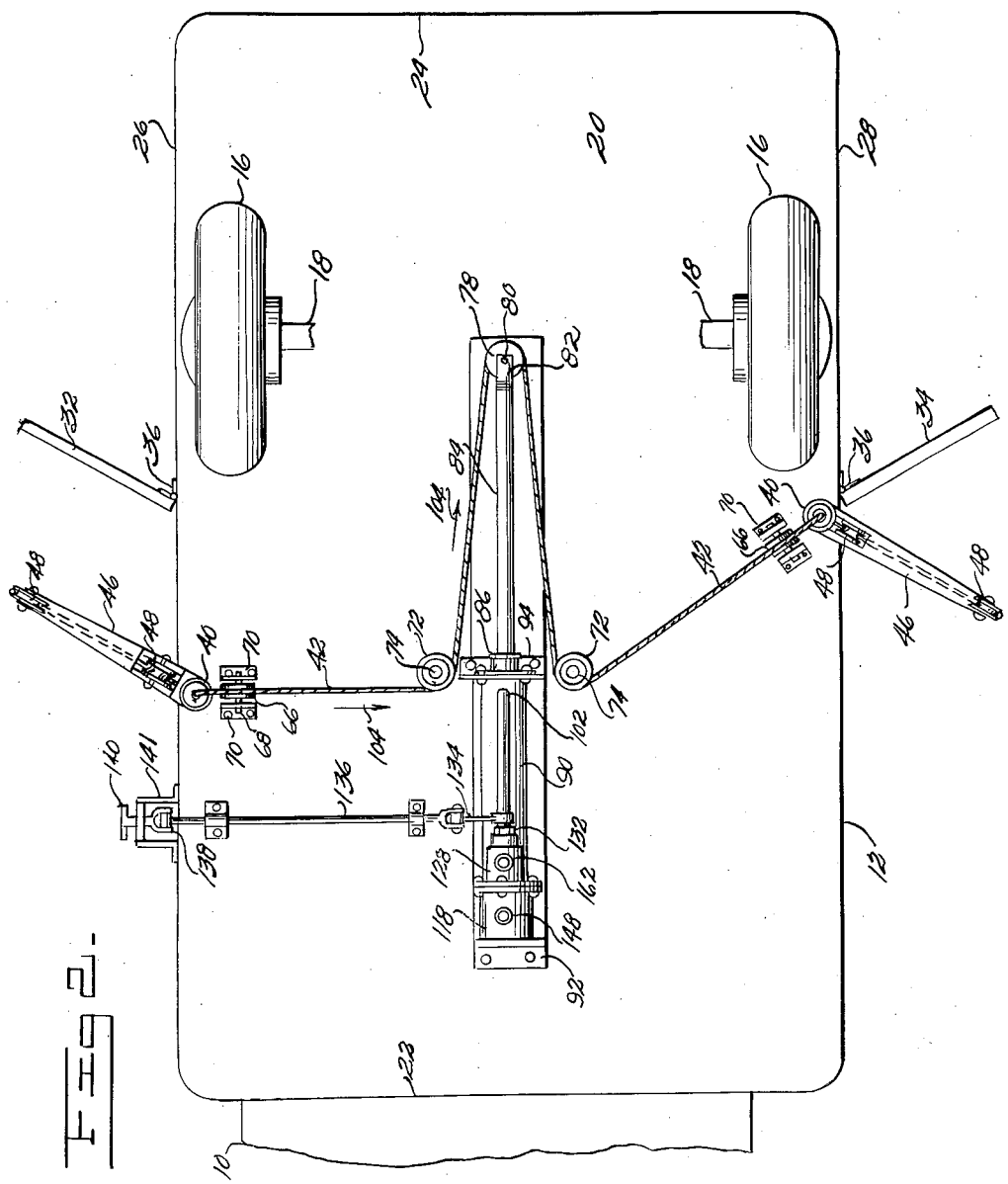
INVENTOR.
ELI J. ADAMS
BY
McMorrow, Berman & Davidson
ATTORNEYS

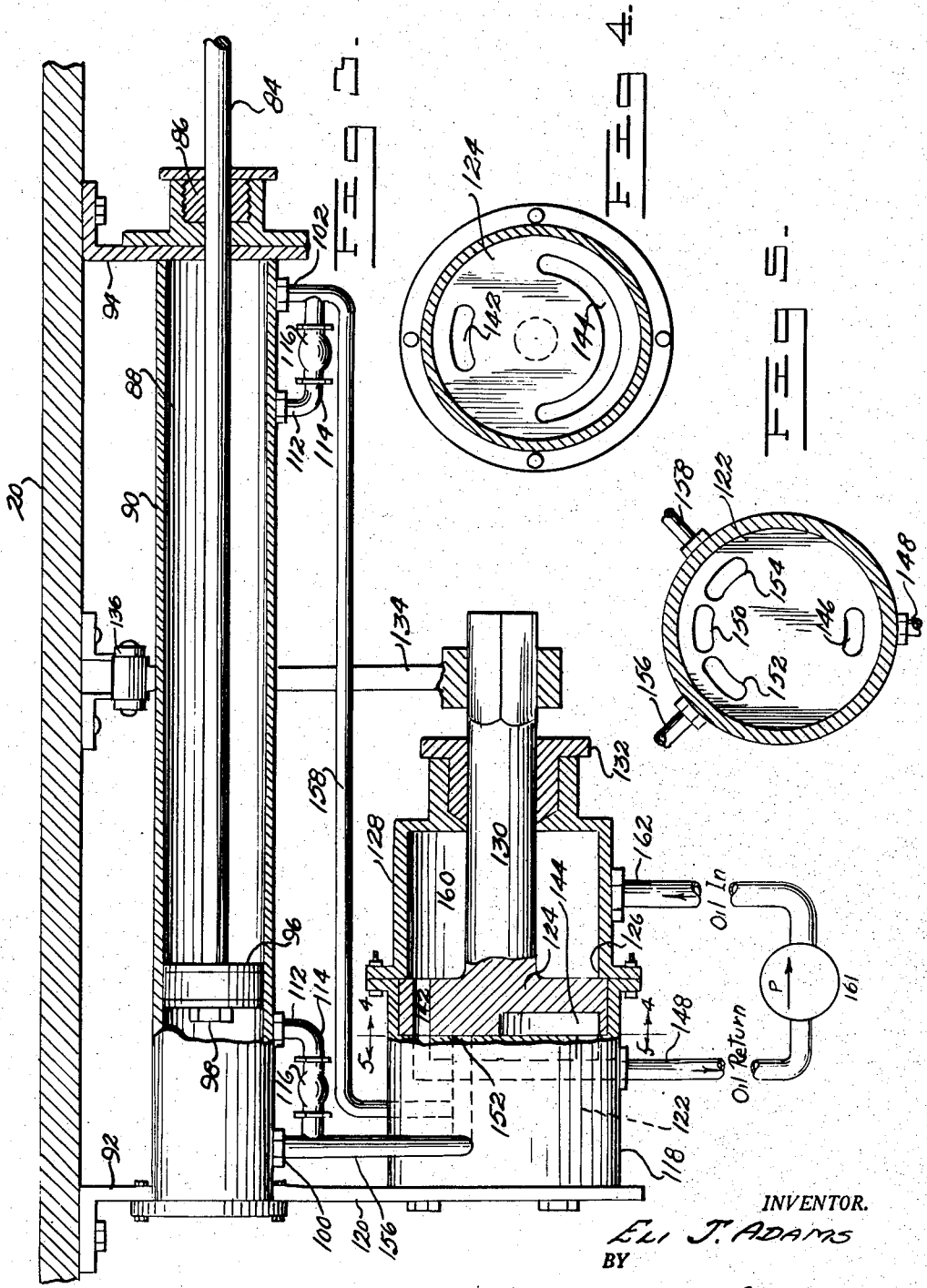

Patented June 27, 1950

2,512,988

UNITED STATES PATENT OFFICE 2,512,988

LOADING AND UNLOADING DEVICE

Eli J. Adams, Rogersville, Mo.

Application March 11, 1947, Serial No. 733,934

4 Claims. (Cl. 212—65)

1

This invention relates to devices for loading milk cans and the like onto vehicles, and for unloading them.

An object of the invention is to provide a device whereby articles such as milk cans and the like may be loaded onto vehicles and unloaded therefrom under the control of the vehicle operator.

Another object of the invention is to provide a device which may be installed on a truck or other vehicle having a source of power, said device including a lifting crane which is actuated by means of a hydraulic cylinder driven by a hydraulic pump, whereby articles engaged by the lifting cable of the crane may be lifted up into the truck, and may also be unloaded from the truck in similar fashion.

A further object of the invention is to provide an article loading device for installation upon a truck or other vehicle having doors on both sides, the device including a hydraulically actuated lifting crane having a lifting cable with lifting hooks at each end, one for each truck door, and being so constructed and arranged that upon opening of one door, the crane for that door swings out automatically for lifting articles into the truck.

Still another object of the invention is to provide a truck loading and unloading device which is simple in design, relatively inexpensive to manufacture, which may be installed in most types of trucks engaged in the transportation of articles, and which is efficient in handling such articles without substantial physical effort on the part of the operator other than control of the operation.

Other objects and advantages of the invention will become apparent from the following description of a preferred embodiment thereof as illustrated in the accompanying drawings, and in which:

Figure 1 is a side elevational view of a truck in which my improved material handling device is installed, the door of the truck being shown open and the device in operation.

Figure 2 is a bottom plan view of the truck shown in Figure 1, as it would be seen looking upwards from beneath the truck.

Figure 3 is a partly sectioned side elevational view of the piston and control valve mechanism of the device.

Figure 4 is a transverse sectional elevation of the control valve as taken on line 4—4 of Figure 3, and Figure 5 is a view similar to that of Figure 4, but looking the other way, that is in the direction 5—5 of Figure 3.

In the operation of trucks such as milk can

2 collecting trucks, where a large number of relatively heavy individual milk cans or other articles must be lifted from the ground up and into the truck body, and must likewise be unloaded, it is uneconomical to handle the task of loading and unloading by muscular power of the operator alone. This is apparent when it is considered that each full milk can weighs about one hundred pounds and may have to be lifted a vertical distance of several feet into the truck body, many such trucks having a capacity of one hundred such cans.

The present invention proposes a solution to this problem, making it unnecessary for the operator of the truck to manually lift the cans into and out of the truck. In order to understand clearly the nature of the invention and the best means for carrying it out, reference may now be had to the drawings, in which like numerals denote similar parts throughout the several views.

As shown, there is a truck having an operator's cab 10 and a truck body 12, both mounted on the truck chassis 14 the rearward end of which is supported upon rear wheels 16 rotatably carried on and driven by the rear axle 18. The truck body has a floor 20, front and rear walls 22 and 24, left and right side walls 26 and 28, and a top member 30. Doors 32 and 34 are hinged at 36 to one vertical edge of doorways formed in the side walls of the truck body as shown, the doors being lockable by means of spring locks 38 adapted for engaging the opposite edges of their doorways.

Just inside each door of the truck body, I prefer to install vertical crane supports comprising hollow tubular posts 40 which may have their upper and lower ends engaged in suitable sockets secured to the floor and ceiling of the truck body respectively. Each of the floor sockets will preferably have an axial aperture formed therein in continuation of the post bores, and should be mounted over a matching aperture formed in the floor itself, to allow free passage therethrough of a lifting cable 42 extending therethrough as will be further explained below.

Each crane support post 40 has a collar 44 rotatably encircling its upper end portion, as best shown in Figure 1, the collar 44 being prevented from downward movement by any suitable means such as a stop collar also encircling the post 40 just below the rotatable collar 44, the stop collar being secured to the post 40 by means of a pin or other fastening member. The collar 44 is integral with a crane arm 46 extending radially therefrom, the crane arm carrying two rotatable sheaves or pulleys 48 over which the lifting cable 42 extends as it emerges from the upper end portion of the hollow support post 40.

A hook 50 is secured to the lower end 52 of the lifting cable by means of an eye 54. The hook shown is particularly designed for lifting milk cans 56 and has an arched body the lower end 58 of which is adapted to bear against the can body to steady it while the hooked arm 60 engages under the handle 62 of the milk can. The lifting hook 50 is provided with a handle 64 which may be grasped by the operator during manipulation of the hook and the can.

The lifting cable 42 extends downward through the bore of the tube 40, and through the floor and the floor socket, and thence extends over a pulley 66 the shaft 68 of which is supported between two brackets 70 on the underside of the truck floor 20, as best shown in Figure 2. The cable continues as shown in the view, extending around a pulley 72 which is rotatable about a shaft 74 fixed to the underside of the truck body.

The cable is then extended around another pulley 78 which is rotatable on a pin 80 extending vertically through the bifurcated end 82 of a longitudinally movable piston shaft 84. The piston shaft 84 extends slidably through a gland packing and nut 86 into a cylinder chamber 88 of the hydraulic cylinder housing 90, which is secured to the underside of the truck body by means of brackets 92 and 94.

A piston 96 is secured on the inner end of the shaft 84 by means of a nut 98, the piston being slidable back and forth inside the cylinder under the influence of hydraulic fluid which may be admitted thereto at either end through ports 100 and 102. It will be seen that admission of hydraulic fluid through port 100 will force the piston 96 to the right as seen in Figure 3, the resultant outward movement of the piston shaft 84 and its pulley 78, will produce a tension on the cable 42 in the direction of the arrows 104, elevating the hook 50 and its attached milk can 56 off the ground, so the boom 46 may then be swung inwards about its post 40 to deposit the milk can inside the truck body onto the floor 20, or the upper deck 106.

Figure 2 shows two side doors on the truck body, each having its own crane support post 40 and crane boom arm 46, there being only one continuous lifting cable 42 the outer end 52 of which have individual lifting hooks 50. A coil spring 108 encircles each support post 40 as shown in Figure 1, and has its lower end engaged in an aperture formed in the support post while its upper end is engaged in an aperture formed in the crane boom arm 46. The spring 108 is so arranged that it normally biases the boom 46 outwardly to the positions shown in Figure 2, closing of the doors 32 retracting the booms inside the truck body and stressing the spring, so that when the door is opened the boom arm automatically swings outward, into loading position.

When the loading is completed, the piston shaft 84 is extended to the position shown in Figure 2, drawing the lifting cable and its hook 50 upwards to a position on the same level with one of the cable securing hooks 110 carried on the inside of each door 32, so that as the door is closed, the adjacent hook 110 may be engaged with the eye 54 on the end of the cable and prevent further upward movement of the cable. It will be seen that this arrangement, securing the cable end against movement when the door is closed, permits the single length of traverse of the piston rod 84 to double the travel of the lifting hook 50 on the open door side of the truck, whereas if both doors were open, with cans being lifted on both sides of the truck at the same time, the cans would be elevated by a distance equal only to the length of the piston rod traverse.

As shown in Figure 3, there is a bypass port 112 located near each main cylinder port, the bypass port being connected to the main port by means of a bypass conduit 114 having a bypass check valve 116 interposed therein. The parts are so constructed and arranged that when the piston is approaching the port 100, for example, and the operator has not stopped the inflow of oil into the cylinder, no damage will be caused and the piston will stop its movement to the left as soon as it passes the bypass port 112, getting between the ports 100 and 112. At this point, the bypass check valve 116 operates to allow the hydraulic fluid from the right side of the piston to flow through the bypass conduit 114, into the port 100, equalizing the pressure on both sides of the piston and stopping the piston travel. The same thing happens when the piston is moving to the right toward port 102.

A control valve 118 is secured to the bracket 92 by means of hanger member 120, and has a fixed valve member 122 disposed inside the valve housing on the left as seen in Figure 3. A rotatable valve member or rotor 124 in the form of a relatively thick disk, is held against longitudinal movement by the abutting shoulder 126 on the valve housing cover member 128, a valve shaft 130 being integral with the rotor 124 and extending out of the valve housing through a gland packing and nut 132.

A crank arm 134 is splined to the outer end of the valve shaft 130 whereby the shaft may be turned about its axis, the outer end of the crank arm being pinned to the inner end of a push-pull rod 136 which in turn is pinned at 138 to a valve handle 140 carried on a bracket 141. The parts are so arranged that a pull on the handle 140 will turn the valve shaft 130 in one direction to admit oil under pressure into the cylinder through port 100 to move the piston shaft to the right, elevating the can hook 50, and pushing the handle 140 in the other direction will turn the valve shaft 130 in the opposite direction to move the piston shaft to the left, lowering the can hook 50.

The rotor 124 is provided with a through opening 142 and a relatively shallow arcuate groove 144, as best seen in Figures 3 and 4. The stator 122 is provided with a discharge opening 146 leading to the discharge port 148, a bypass port 150 interconnected with the discharge opening 146 as shown in Figure 3, and two ports 152 and 154 which are connected to oil conduits 156 and 158 respectively, which lead to cylinder ports 100 and 102. Oil from a pump 161 and operated by the vehicle motor, enters the annular chamber 160 through inlet pipe 162, and, if the valve shaft 130 is in the neutral position with ports 142 and 150 in registry, the oil merely circulates through the valve housing and back to the pump through pipe 148, none of it going to the cylinder.

When the valve shaft 130 is turned to bring port 142 into registry with port 152, then incoming oil flows through pipe 156 and port 100 into the cylinder, pushing the piston to the right as seen in Figure 3, and elevating the can hook 50. The oil returns through pipe 158, and port 154 from which it flows through groove 144 and port 146 into return pipe 148. When the valve shaft 130 is turned to bring port 142 into registry with port 154, the incoming oil flows through pipe 158 to the cylinder, pushing the piston to the left, the oil returning through pipe 156, ports 152 and groove 144, into port 146 and return pipe 148.

The valve actuating handle 140 may conveniently be mounted just forwardly of the door 32 as to be accessible to the operator whether he be standing on the ground alongside the truck to load the cans, or inside the truck to unload them. Each door may be provided with such a handle 140 and associated connecting levers so as to actuate the valve control shaft 130.

Although I have described a preferred embodiment of my invention in specific terms, it is to be understood that various changes may be made in size, shape, materials and arrangement without departing from the spirit and scope of the invention as claimed.

I claim:

1. An article lifting device adapted for being installed in a truck, comprising a pair of upright hollow tubular posts secured on opposite sides of the truck, crane boom arms rotatably engaging said posts near their upper ends, resilient means normally biasing said boom arms into positions extending outward from the truck body, a hydraulic cylinder, a piston movable in said cylinder under the influence of hydraulic fluid admitted into the cylinder, a piston shaft extending into said cylinder and engaging said piston whereby the piston shaft is reciprocally movable with the said piston, a first pulley rotatably carried on the outer end of said piston shaft, a lifting cable extending around the said first pulley, a pair of second pulleys on each side of said first pulley and carried rotatably on relatively stationary pins on said truck body, said lifting cable extending on each side of said first pulley and around said second pulleys, said cable thence extending in opposite directions from said second pulleys to and upwards through said hollow tubular posts, third pulleys rotatably carried on said boom arms, said cable extending upwards out of said tubular posts and over said third pulleys and thence downward, article engaging hooks carried on the outer ends of said lifting cable for engaging any article to be lifted, whereby upon movement of said hydraulic piston shaft in one direction said lifting cable is stressed to elevate the said article engaging hooks and the articles engaged thereby, and upon movement of said piston shaft in the opposite direction said lifting cable and hooks are lowered to initial positions.

2. An article lifting device adapted for being installed in a truck body, comprising a pair of upright hollow tubular posts secured on opposite sides of the truck floor inside the truck side doors, crane boom arms rotatably carried by said posts near their upper ends, first pulleys on said boom arms, resilient means normally biasing said boom arms into positions extending outward from the truck body, a hydraulic cylinder on said truck, a piston movable in said cylinder under the influence of hydraulic fluid admitted into the cylinder, a piston shaft extending into said cylinder and engaging said piston whereby the piston shaft is reciprocally movable with said piston, a second pulley rotatably carried on the outer end of the piston shaft, a lifting cable having an intermediate portion thereof extending around said second pulley and across the path of said piston shaft, said cable extending thence in opposite directions through said opposite hollow tubular posts and upwards over the said first pulleys and thence downwards, lifting hooks secured to the outer ends of said lifting cable, port and conduit means connected to said cylinder for conducting hydraulic fluid under pressure into and out of said cylinder to move the piston, an oil pump for circulating oil to said cylinder and back to the pump, and a control valve interposed in the conduits between said oil pump and said cylinder for regulating the flow of fluid to the cylinder, means for retracting said boom arms inside the truck body upon closing its doors, and means operable upon closing a door for holding the adjacent lifting cable end stationary.

3. An article-lifting device adapted to be installed in a truck body including a floor, comprising a pair of laterally-spaced crane boom arms located adjacent opposite sides of said body above said floor, means mounting said arms for lateral pivotal movement to and from positions laterally inwardly of and laterally outwardly of said body and floor, a piston and piston shaft carried by said body for reciprocation longitudinally thereof between said arms, said shaft including a free end, a lifting cable including a pair of free ends and an intermediate portion, article-engaging means carried by said free ends of said cable, said intermediate portion of said cable being slidably connected to said free end of said piston shaft, guides carried by said truck body and boom arms for guiding said free ends of said cable over said boom arms in lifting and lowering relation thereto upon reciprocation of said piston and shaft in opposite directions, and means for at times anchoring one free end of said cable.

4. An article-lifting device adapted to be installed in a truck body including a pair of opposed side doors adapted to close door openings and a floor, comprising a pair of laterally-spaced crane boom arms located adjacent opposite sides of said body above said floor and adjacent said doors inwardly thereof, means mounting said arms for lateral pivotal movement to and from positions laterally inwardly of and laterally outwardly of said body and floor through said door openings when the doors are open, spring means loading said boom arms for movement laterally outwardly of said body, a piston and piston shaft carried by said body for reciprocation longitudinally thereof between said arms, said shaft including a free end, a lifting cable including a pair of free ends and an intermediate portion, article-engaging means carried by said free ends of said cable, said intermediate portion of said cable being slidably connected to said free end of said piston shaft, guides carried by said truck body and boom arms for guiding said free ends of said cable over said boom arms in lifting and lowering relation thereto upon reciprocation of said piston and shaft in opposite directions, and means carried by each door for anchoring said free ends of said cable when said doors are closed.

ELI J. ADAMS.

REFERENCES CITED

The following references are of record in the file of this patent:

UNITED STATES PATENTS

| Number | Name | Date |
|---|---|---|
| 280,904 | Boyer | July 10, 1883 |
| 655,321 | Anderson | Aug. 7, 1900 |
| 1,291,746 | Bradney et al. | Jan. 21, 1919 |
| 1,509,800 | Vogel | Sept. 23, 1924 |
| 2,446,488 | Pierce | Aug. 3, 1948 |